US005458435A

United States Patent [19]

Kohno

[11] Patent Number: 5,458,435

[45] Date of Patent: Oct. 17, 1995

[54] OPENING AND CLOSING APPARATUS FOR MANHOLE COVER

[76] Inventor: Kazuhiko Kohno, 40-1-No. 108, 2 Chome, Kotakecho, Nerima-ku, Tokyo, Japan

[21] Appl. No.: 248,202

[22] Filed: May 24, 1994

[30] Foreign Application Priority Data

Apr. 11, 1994 [JP] Japan .................................... 6-105840

[51] Int. Cl.[6] ........................................ B60P 3/00

[52] U.S. Cl. ................................ 404/25; 52/20; 414/459; 414/618

[58] Field of Search ............................ 404/25, 26; 52/19, 52/20; 414/618, 457, 458, 459, 495

[56] References Cited

U.S. PATENT DOCUMENTS

| | | | |
|---|---|---|---|
| 2,784,860 | 3/1957 | Van Huben | 414/618 |
| 3,275,299 | 9/1966 | MeShew | 414/457 X |
| 3,768,676 | 10/1973 | Spitzer | 414/459 |
| 4,897,011 | 1/1990 | Brower | 414/459 |
| 5,044,864 | 9/1991 | Stefan | 414/459 |

*Primary Examiner*—William P. Neuder

*Attorney, Agent, or Firm*—Wenderoth, Lind & Ponack

[57] ABSTRACT

An opening and closing apparatus for a manhole cover includes a supporting member 2 having a number of elongated holes 1, two hook rods 4, each having a lower hook, and extending vertically through one of the elongated holes 1 of the supporting member 2, and a bracket 5 through which each hook rod 4 extends. A clamp 6 permits adjustment of the vertical position of each hook rod 4. Two horizontal extension members 8 horizontally adjustably connect to opposite ends of the supporting member 2 so that an upper surface of each horizontal extension member 8 wholly or partially overlaps the supporting member 2. A set of bolts 9 and nuts 10 tightly fasten the supporting member 2 to each horizontal extension member 8. A leg 11 projects downward from an inner end of each horizontal extension member 8. A hydraulic jack unit 17 has a base 15, two wheels 16 supported on the base 15, a fixed portion 14 fixed to an upper surface on the base 15 and standing upright therefrom, a lever 12, and a movable portion 13 adapted to be vertically moved by operating the lever 12. The movable portion 13 has a side surface integrally connected to an outer end of each horizontal extension member 8 and extends vertically at right angles to each horizontal extension member 8.

7 Claims, 4 Drawing Sheets

OPENING AND CLOSING APPARATUS FOR MANHOLE COVER

BACKGROUND OF THE INVENTION

1. Field of the Invention

The present invention relates to an opening and closing apparatus for a manhole cover for safely and securely opening, closing, and moving a special manhole cover such as a thick-walled large-diameter cover, a double cover and a raised cover, as well as a normal manhole cover.

2. State of the Prior Art

A manhole cover having a diameter of 1 m or more and a weight of 300 to 400 kg was mainly used in the past. Such a manhole cover was not bonded to a seat for maintaining the manhole cover at rest, and a gap of 5 mm or more was defined between the manhole cover and a side wall of the seat. In opening the manhole cover, a crowbar was used to pry the manhole cover, or a hook was used to catch hold of the manhole cover and raise it forcefully, then sliding it horizontally. However, as the manhole cover was a heavy load, physical fatigue, injury, acute lower back pain, etc. of the operator become a problem.

Subsequently, the facts that the manhole cover could be relatively easily opened by anyone, and that the manhole cover could be undesirably opened by sewage flowing back in case of flood, were considered as other problems, in view of both security and safety. Accordingly, the manhole cover was bonded to the seat by adhesive to prevent easy opening of the manhole cover. Further, the gap between the manhole cover and the side wall of the seat was also zero, so that even when someone tried to pry the manhole cover up with a lever, the lever was hindered by the side wall of the seat so that the manhole cover could not be completely opened.

In these circumstances, the present applicant filed a utility model entitled "Opening and Closing Machine for Manhole Cover" on Jul. 24, 1990 (Japanese Utility Model Application No. Hei 2-77849). The utility model discloses an opening and closing machine for a manhole cover, comprising a hydraulic pump adapted to be vertically expanded and contracted, a horizontal extension bar extending horizontally from a side surface of the hydraulic pump at an upper portion thereof, wheels provided at a lower portion of the hydraulic pump arranged in tandem in a direction perpendicular to the horizontal extension bar, a supporting portion projecting downward from one end of the horizontal extension bar, and a tightening rod with a lower hook extending vertically through the horizontal extension bar at an intermediate region thereof. Further, this utility model describes at page 3, line 12 to page 4 line 6 a manner of usage of the opening and closing machine as follows. Two catch holes of every manhole cover, inclusive of a round cover and a rectangular cover, are formed at right and left positions such that the raised manhole cover can be balanced in weight. The opening and closing machine is located on the right-hand side of the manhole cover, and another opening and closing machine, having the same structure as that of the above machine, is located on the left-hand side of the manhole cover in such a manner that the sets of wheels of both of the machines are opposed to each other in parallel. The wheels are laid on the ground surface, and the supporting portions are laid on the manhole cover. The lower hooks of the tightening rods vertically extending through the horizontal extension bars are brought into engagement with the catch holes of the manhole cover, and then tightened. Thereafter, the hydraulic pumps of the two opening and closing machines are simultaneously expanded. As a result, the manhole cover is raised in a horizontal condition by strong forces generated from the hydraulic pumps. When the manhole cover is horizontally pulled in this raised condition, the wheels function to easily move the two machines holding the manhole cover, thus completely opening the manhole cover. The above opening operation is completed within one minute. In closing the manhole cover, the above operation is performed in the reverse order.

PROBLEM TO BE SOLVED BY THE PRESENT INVENTION

If the two opening and closing machines of the above-discussed Japanese Utility Model Application are not parallel to each other after raising the manhole cover in the horizontal condition, there is a possibility that the machines may not be smoothly moved or may be unintentionally turned, even by pulling the manhole cover, which may be dangerous. Further, in horizontally pulling the manhole cover to move the machines, there is a possibility that the integral relation and the balance between the manhole cover and the machines may be broken. In this respect, there is a stability problem.

In addition to the above conventional manhole cover, there presently exist various manhole covers, inclusive of a thick-walled large-diameter cover having a thickness of 17 cm, a diameter of 2 m, and a weight of 1 t or more, a double cover consisting of an outside cover and an inside cover rest on a stepped seat formed in the manhole, and a raised cover resting at a position higher in level than the ground surface. These special covers cannot be opened by the above conventional opening and closing machines for the following reasons.

The thick-walled large-diameter cover is bonded to the seat, so that a force of 5 to 6 t is instantaneously required in order to break the adhesion of the cover to the seat and to lift the cover. Thus, the cover cannot be absolutely opened by man power. Accordingly, the present way to open the cover is to hook the cover with a wire of a 6 t-crane truck and lift the cover. Although specifically described before because of no need, the average maximum load value of the hydraulic pump in the above-mentioned opening and closing machine is 2 t. Accordingly, the average maximum load value of the two hydraulic pumps by the use of the two machines becomes 4 t. Further, the instantaneous maximum load value of the two hydraulic pumps, upon application of hydraulic pressure, becomes 6 t of more due to the structure. However, these opening and closing machines cannot in actuality open the thick-walled large-diameter cover. This is due to the fact that the heavy load brings about the exertion of a strong force inwardly inclining the machines at the instance of application of hydraulic pressure, resulting in the cancellation of the force vertically lifting the manhole cover.

The reason for the above phenomenon will no be described on the basis of lever mechanics. Basically, the structure of each machine is such that a lower end of the supporting portion corresponds to a fulcrum, a line extending from this fulcrum through an intersection between the horizontal extension bar and the tightening rod, or a point of action of the load, corresponds to a lever, and an intersection between this lever and a line vertically extending from the set of wheels corresponds to a point of action of effort. The manhole cover and the machine are mechanically integrated by engaging the hook of the machine with the catch hole of the manhole cover. Accordingly, in this condition, the set of wheels of the other machine becomes a fulcrum, a line extending from this fulcrum through the intersection between the horizontal extension bar and the tightening rod, or a point of action of the load, becomes a lever, and an intersection between this lever and a line vertically extending from the set of wheels becomes a point of action of effort. In the case of the conventional manhole cover requiring a relative small force to open, the two machines operate mutually in the above manner to open the manhole cover. However, in the case of the thick-walled large-diameter cover requiring a very large force to open, the relation between the manhole cover and the ground surface is equivalent to an integral condition, unless the manhole cover is just opened. Accordingly, the forces generated from the two machines are not integrated, and the mutual mechanical relationship between the two machines is broken. As a result each machine operates in such a manner that the lower end of the supporting portion becomes a fulcrum, the line extending from this fulcrum through the intersection between the horizontal extension bar and the tightening rod, or a point of action of the load, becomes a lever, and the intersection between the lever and the line vertically extending from the set of wheels becomes a point of action of effort. This case is that the hook of each machine tries to pry the manhole cover at each catch hole with independent levers having fixed fulcrums at the lower ends of the supporting portions. If the cover were a deformable cover, such as a stopper of a beer bottle, the cover would be bent at the fulcrum to be opened at the edge. However, the heavy manhole cover in this case cannot be bent at the fulcrum, so that it cannot be opened however greatly the pressures of the hydraulic pumps are increased. The smaller the angle of the lever, the more the direction of the force applied at the point of action of load approaches the vertical direction. Since the angle of the lever in each machine having the fulcrum at the lower end of the supporting portion is very large, the direction of the force applied at the point of action of the load is inwardly inclined. When the hydraulic pump in each machine is expanded, the machine itself is inwardly inclined, resulting in a cancellation of the force lifting the machine cover. Thus, the manhole cover cannot be opened. While G is applied to the individual machines by tightening the hook with the tightening rod, the tightening force is not added to the force lifting the manhole cover because the manhole cover is supported by the supporting portion.

The double cover mentioned above is used for a manhole in an airport. The outside of the double cover can be opened and closed by the above conventional machines even when the outside cover is bonded to the seat, because the outside cover is the same as the conventional manhole cover. On the other hand, the inside cover of the double cover is located below the ground surface by about 10 cm. Accordingly, the tightening rod can reach the inside cover, but the lower end of the supporting portion normally level with the ground surface cannot be laid on the inside cover. As a result, an opening and closing operation of the inside cover cannot be performed by the above machine. Accordingly, a wrecker truck is usually required to open the inside cover.

The opening and closing machine was originally developed with the condition that the manhole cover is level with the ground surface. Accordingly, when the manhole cover is located below ground surface, the machine is inwardly inclined where the supporting portion comes to contact with the manhole cover. As a result, the force lifting the manhole cover is greatly cancelled, and the manhole cover cannot be opened.

The raised cover mentioned above is located on a level higher than the ground surface, so as to prevent rainwater or the like from flowing into the manhole. The supporting portion of the machine can be laid on the manhole cover, and the hook of the tightening rod can catch hold of the manhole cover. However, the wheels leave the ground surface, because the manhole cover is higher in level than the ground surface. As a result, the opening and closing operation of the manhole cover cannot be performed by the above machine.

The machine was originally developed with the condition that the manhole cover is level with the ground surface. Accordingly, when the manhole cover is located above the ground surface, the machine is outwardly inclined where the wheels come into contact with the ground surface. As a result, the force lifting the manhole cover is largely cancelled, and the manhole cover cannot be opened.

It is, accordingly, an object of the present invention to provide an opening and closing apparatus for a manhole cover which can solve the above problems of the above-mentioned opening and closing machine.

SUMMARY OF THE INVENTION

According to the present invention, there is provided an opening and closing apparatus for a manhole cover comprising a supporting member as a sectionally U-shaped straight bar having a required number of elongated holes on a longitudinal center line. Two hook rods each have a lower hook and an external thread for adjustment of the vertical position of the lower hook, with each of the hook rods extending vertically through one of the elongated holes of the supporting member so as to be rotatable and adjustable in horizontal position. A bracket U-shaped in section is disposed on an upper surface of said supporting member so as to be adjustable in horizontal position, the bracket having a central hole through which each hook rod extends. A clamp has an internal thread engaging with the external thread of each hook rod, the clamp being supported on an upper surface of the bracket and adapted to be rotated for vertical position adjustment of each hook rod. Two horizontal extension members, straight bars U-shaped in section each have an elongated hole on a longitudinal center line, the two horizontal extension members being horizontally adjustably connected to opposite ends of the supporting member so that an upper surface of each horizontal extension member wholly or partially overlaps a lower surface of the supporting member. A set of bolts and nuts tightly fasten the supporting member to each horizontal extension member so as to mechanically unite them together, the bolt extending through one of the elongated holes of the supporting member and the elongated hole of each horizontal extension member. A leg projects downward from an inner end of each horizontal extension member, and a hydraulic jack unit has a base, two wheels supported on the base at front and rear ends thereof arranged in tandem in a direction perpendicular to each horizontal extension member, a fixed portion fixed to an upper surface of the based and standing upright therefrom, a lever, and a movable portion adapted to be vertically moved by operating the lever. The movable portion has a side surface integrally connected to an outer end of each horizontal extension member extending vertically and at right angles to each horizontal extension member.

DETAILED DESCRIPTION OF THE INVENTION

Figure 1A:
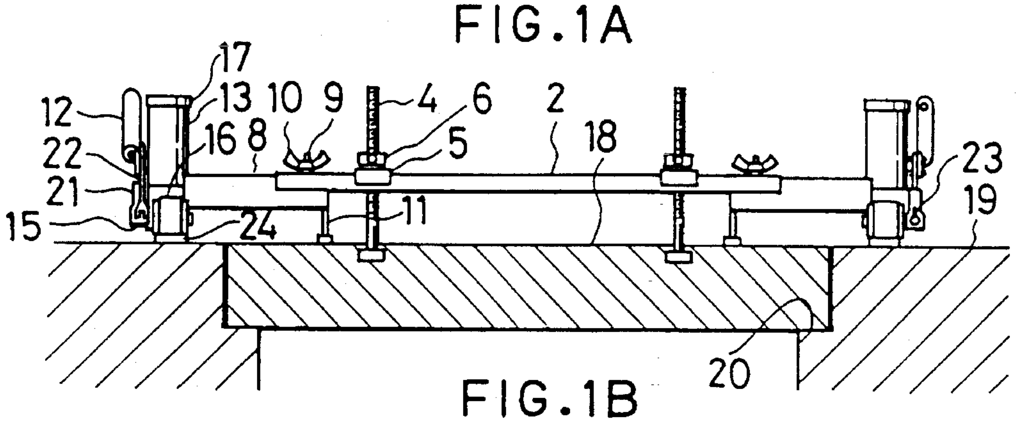
FIGS. 1A–1C are front and plan views of an opening and closing apparatus for a manhole cover according to the present invention.
Figure 1B:
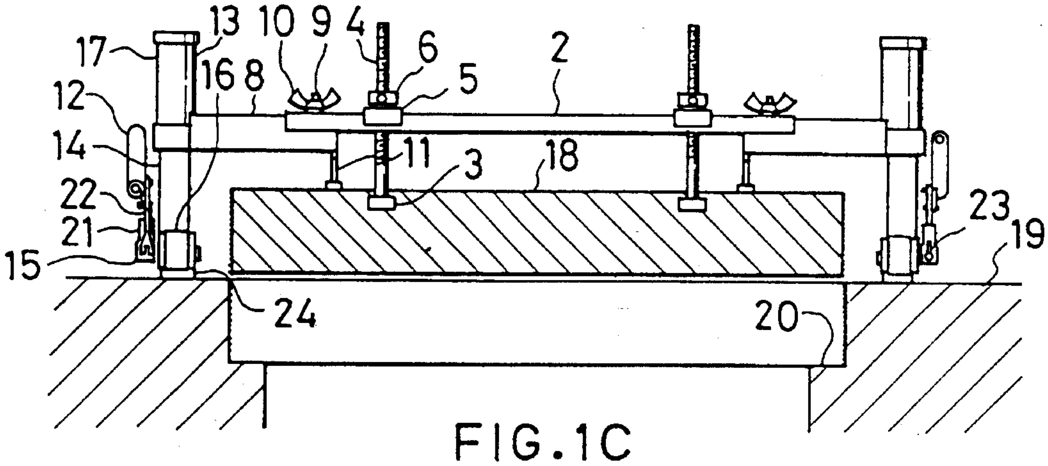
Figure 1C:
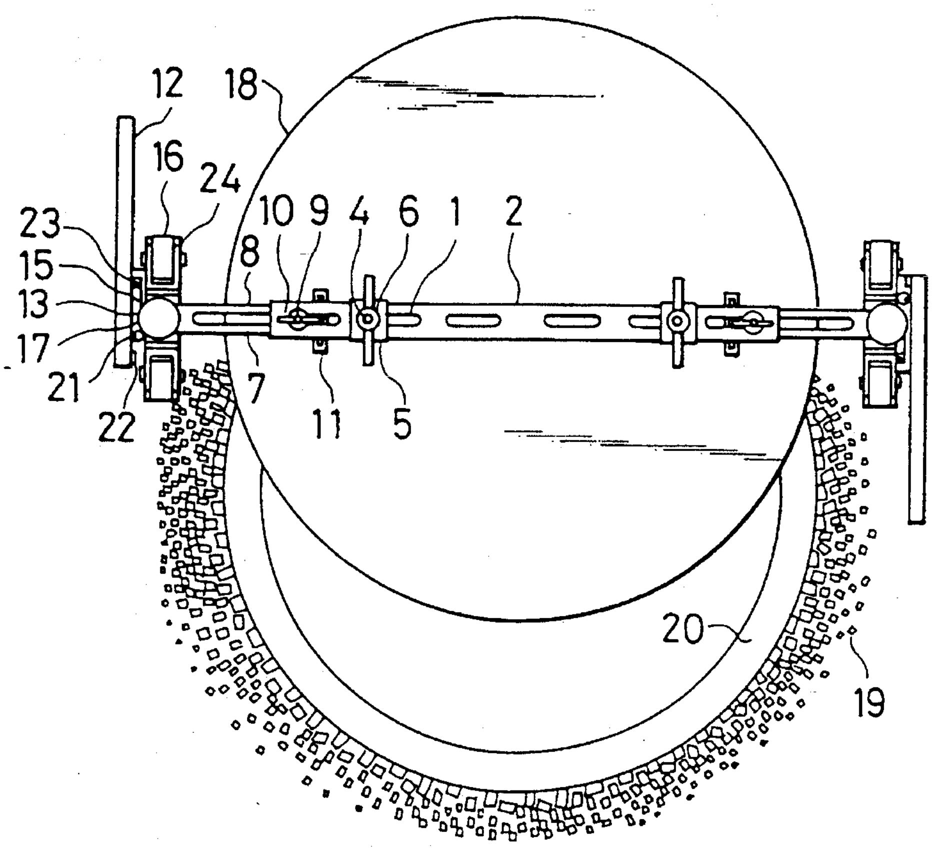

A preferred embodiment of the present invention will now be described with reference to the accompanying drawings. However, it should be appreciated that the present invention is not limited to the preferred embodiment shown.

Reference numeral 2 denotes a supporting member and is a sectionally U-shaped straight bar having six elongated holes 1 along a longitudinal center line.

Figure 5:
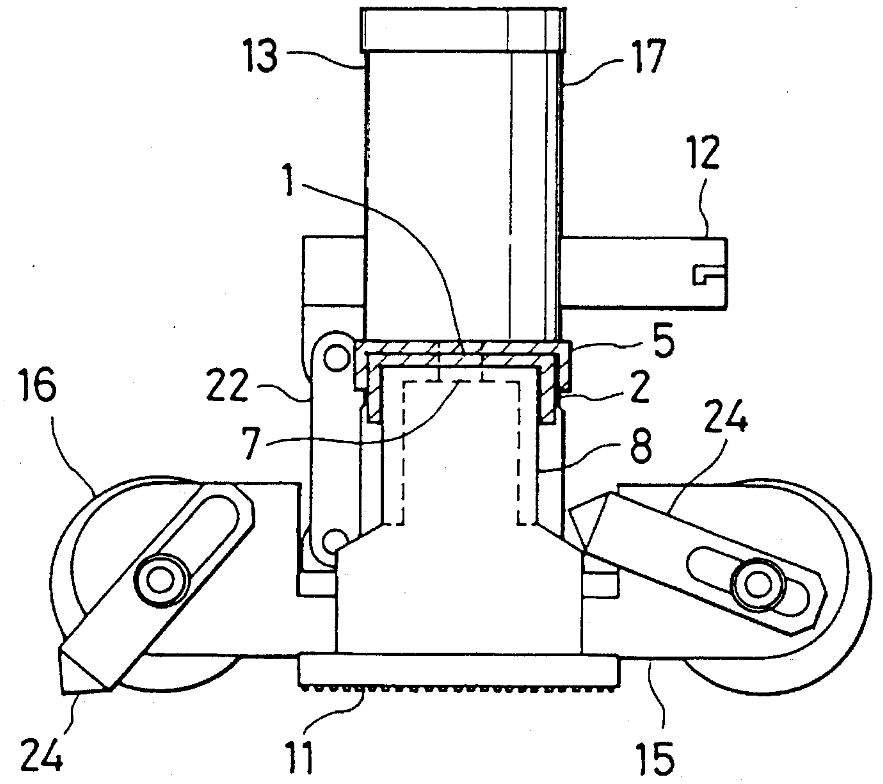
FIG. 5 is a sectional side view of the opening and closing apparatus for a manhole cover according to the present invention.
Figure 6:
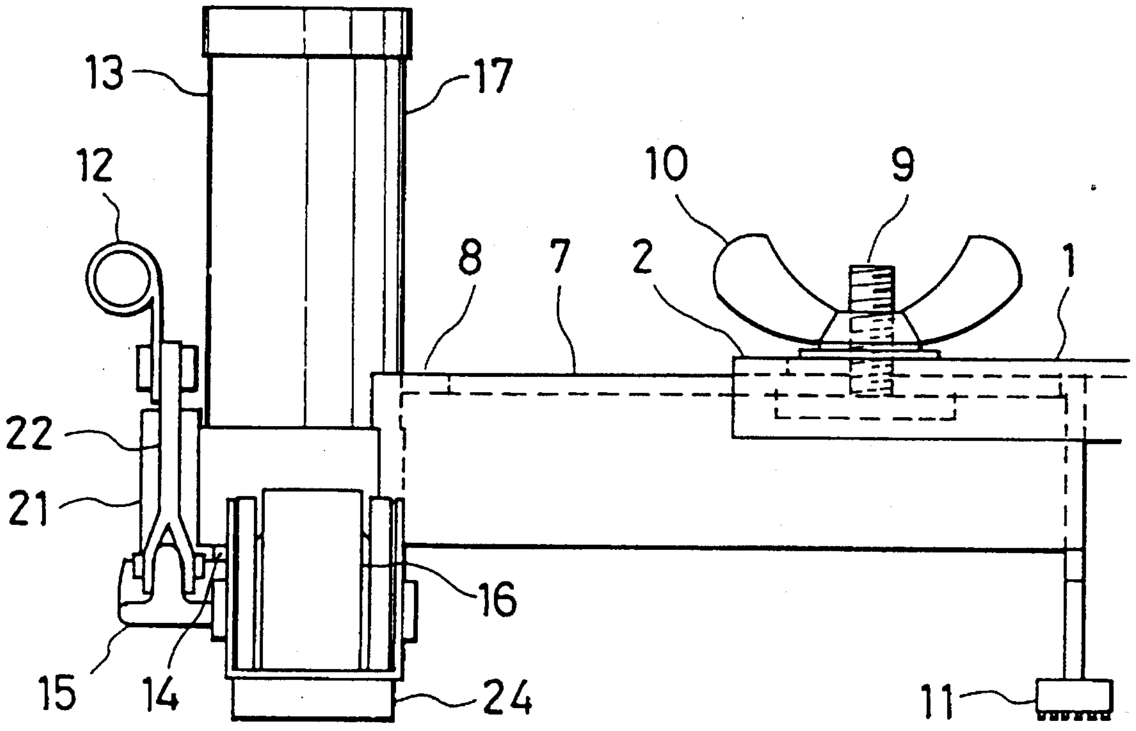
FIG. 6 is an enlarged partial front view of an opening and closing apparatus for a manhole cover according to the present invention.

Reference numerals 4 denote two hook rods each having a lower hook 3. The two hook rods 4 extend vertically through two intermediate ones of the six elongated holes 1 of the supporting member 2 so as to be rotatable and horizontally movable for adjustment in horizontal position. Each hook rod 4 extends through a central hole of a sectionally U-shaped bracket 5 that is slidably disposed on an upper surface of the supporting member 2. Each hook rod 4 is formed with an external thread. A clamp 6 having an internal thread engaging with the external thread of each hook rod 4 is supported on an upper surface of the bracket 5. The clamp 6 is provided with a handle for rotational operation. FIG. 5 shows a cross section of the supporting member 1 and the bracket 5, with the associated hook rod 4, the associated clamp 6, and a set of bolts 9 and nuts 10 being omitted.

Reference numerals 8 denote two horizontal extension members, which are sectionally U-shaped straight bars each having an elongated hole 7 on a longitudinal center line thereof. The two horizontal extension members 8 are slidably connected to opposite ends of the supporting member 2 so that an upper surface of each horizontal extension member 8 wholly or partially overlaps a lower surface of the supporting member 2 to enable adjustment in horizontal position. Each horizontal extension member 8 can be tightly fastened to the supporting member 2 so that they are mechanically united together by means of a set of bolts 9 and nuts 10. A bolt 9 extends through the elongated hole 7 of each horizontal extension member 8 and one of the elongated holes 1 of the supporting member 2. In this preferred embodiment, each bolt 9 is a bolt with a backing member, and each nut 10 is a wing nut. A leg 11 projects downward from an inner end of each horizontal extension member 8. A lower end of the leg 11 is level with a ground surface 19 in a condition where a vertically movable portion 13 is fully lowered, so that the leg 11 functions as a support for each horizontal extension member 8 when the associated nut 10 is loosened. The lower end of the leg 11 has a nonslip surface adapted to contact a manhole cover 18.

Reference numeral 17 denotes a hydraulic jack unit. The hydraulic jack unit 17 has the following structure. That is, the side surface of the movable portion 13 is integrally connected to an outer end of each horizontal extension member 8, and the movable portion 13 extends vertically at right angles to each horizontal extension member 8. A fixed portion 14 is fixed to an upper surface of a base 15. Two wheels 16 are supported on the base 15 at front and rear ends thereof and are arranged in tandem in a direction perpendicular to each horizontal extension member 8. The base 15 is provided with a pump 21 for feeding oil to the hydraulic jack unit 17, a crank 22 for applying pressure to the pump 21, and a valve 23 for reducing pressure in the hydraulic jack unit 17 to lower the movable portion 13. A lever 12 is connected to the crank 22. In this preferred embodiment, the lever 12 is detachable for ease of transportation. Reference numeral 24 denotes a stopper slidably and rotatably mounted on an axle of each wheel 16. In FIG. 5, the stopper 24 on the left-hand side is in an operative condition such that the stopper 24 acts on the associated wheel 16 and the ground surface 19 to stop the wheel 16, even on a slope. In contrast, the stopper 24 on the right-hand side is in an inoperative condition.

In transporting or storing the opening and closing apparatus mentioned above, each hydraulic jack unit 17, with the associated horizontal extension member 8, the supporting member 2, and the brackets 5, can be demounted by disengaging the bolts 9 and the nuts 10 and disengaging the clamps 9 and the hook rods 4.

The operation and specific usage of the opening and closing apparatus for the manhole cover will now be described with further reference to the drawings.

First, the bolts 9 inserted through the elongated holes 1 and 7 are loosened by rotating the nuts 10 to make both the horizontal extension members 8 slidable relative to the supporting member 2. In this condition, the horizontal positions of the horizontal extension members 8 are adjusted so that the total length of the supporting member 2 and the horizontal extension members 8, overlapping each other, becomes greater than the diameter of the manhole cover 18. Then, the nuts 10 are tightened to fix the supporting member 2 and the horizontal extension members 8 together to such a degree that these members 2 and 8 are mechanically united together. The reasons why the supporting member 2 and the horizontal extension members 8 are formed as sectionally U-shaped straight bars are to reduce weight, ensure strength against a downward load, provide a guide rail function, and easily obtain a straight bar by tightening the nuts 10.

Then, the two hook rods 4 are horizontally moved in the elongated holes 1 with the brackets 5 sliding on the supporting member 2 to adjust their horizontal positions. Then the clamps 6 are rotated to vertically move the hook rods 4 until the lower hooks 3 are inserted into two catch holes formed on the upper surface of the manhole cover 18. Then the hook rods 4 are rotated to make the lower hooks 3 engage with the catch holes. Then the clamps 6 are rotated to raise the hook rods 4 and thereby tighten the lower hooks 3. Accordingly, G is applied to the whole of the apparatus, so that the operation can be advanced in a stable condition, and the tightening force applied to the lower hooks 3 is added to a force for raising the manhole cover 18 (which differs in this respect from the tightening rod in the conventional opening and closing machine). This effect can be similarly exhibited in the case where the lower hooks 3 are formed like hook-shaped wires. The reason why the brackets 5 are formed as sectionally U-shaped members is to ensure strength against a downward load, providing a guide rail function, and disperse the load of the manhole cover 18 applied to the clamps 6, transmitting it to the supporting member 2.

The levers 12 of the right and left jack units 17 are then operated to feed oil and thereby vertically raise the movable portions 13. As a result, the supporting member 2 integrated with the horizontal extension members 8 is vertically raised together with the movable portions 13 with the jack units 17 maintained in a vertical position. Accordingly, 100% of the vertical force for raising the supporting member 2 is applied to the two hook rods 4, thus breaking the adhesion between the manhole cover 18 and its seat and opening the manhole cover 18. This results from the fact that the forces generated from the two jack units 17 have been integrated through the supporting member 2 without waste. This means an ideal vertical jack as the opening and closing apparatus for manhole cover, rather than the application of lever mechanics (which differs in this respect from the hydraulic pump in the conventional opening and closing machine). In horizontally moving the manhole cover 18 in the raised condition, the manhole cover 18 can be balanced and stabilized, because the manhole cover 18 is supported by the hook rods 4 depending perpendicularly from the supporting member 2. Furthermore, since the sets of wheels 16 on the right and left jack units 17 are always kept parallel to each other, the apparatus can be smoothly moved without unintentional turning. In addition, even when the legs 11 projecting downward from the horizontal extension members 8 are separated from the manhole cover 18, no trouble occurs in the operation (which differs in this respect from the supporting portion in the conventional opening and closing machine).

Figure 2:
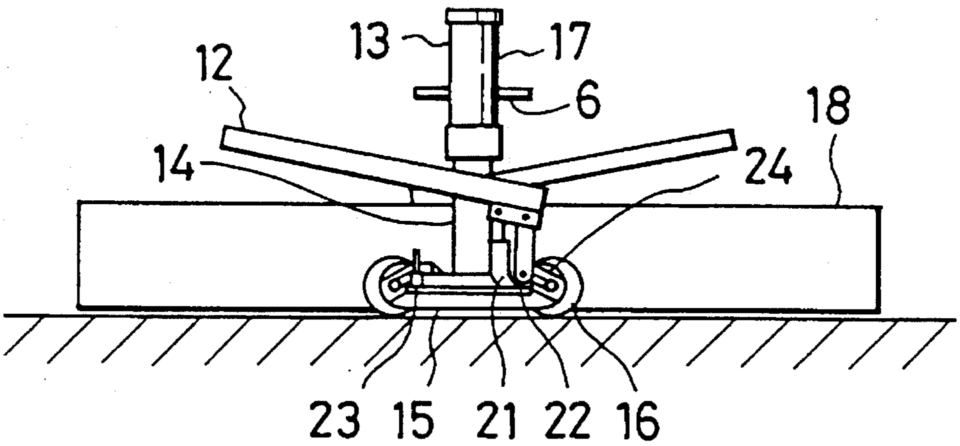
FIG. 2 is a side view of the opening and closing apparatus for a manhole cover according to the present invention.

FIGS. 1(A), (B), (C) and FIG. 2 show a case where the manhole cover 18 is a thick-walled large-diameter cover. First, the bolts 9 inserted through the elongated holes 1 and 7 are loosened by rotating the nuts 10 to make both the horizontal extension members 8 slidable relative to the supporting member 2. In this condition, the horizontal positions of the horizontal extension members 8 are adjusted so that the total length of the supporting member 2 and the horizontal extension members 8, overlapping each other, becomes greater than the diameter of the manhole cover 18. Then, the nuts 10 are tightened to fix the supporting member 2 and the horizontal extension members 8 together to such a degree that these members 2 and 8 are mechanically united together. In this condition, the legs 11 are placed on the upper surface of the manhole cover 18, and the wheels 16 are placed on the ground surface 19. Then, the two hook rods 4 are horizontally moved in the elongated holes 1, with the brackets 5 sliding on the supporting member 2, to adjust their horizontal positions. Then the clamps 6 are rotated to vertically move the hook rods 4 until the lower hooks 3 are inserted into two catch holes formed on the upper surface of the manhole cover 18. Then the hook rods 4 are rotated to make the lower hooks 3 engage with the catch holes. The clamps 6 are then rotated to raise the hook rods 4 and thereby tighten the lower hooks 3. Accordingly, G is applied to the whole of the apparatus, so that the operation can be advanced in a stable condition, and the tightening force applied to the lower hooks 3 is added to a force for raising the manhole cover 18. This effect can be similarly exhibited in the case where the lower hooks 3 are formed like hook-shaped wires. The levers 12 of the right and left jack units 17 are then operated to feed oil and thereby vertically raise the movable portions 13. As a result, the supporting member 2 integrated with the horizontal extension members 8 is vertically raised together with the movable portions 13, with the jack units 17 maintained in a vertical position. Accordingly, 100% of the vertical force for raising the supporting member 2 is applied to the two hook rods 4, thus breaking the adhesion between the manhole cover 18 and its seat and opening the manhole cover 18. This results from the fact that the forces generated from the two jack units 17 have been integrated through the supporting member 2 without waste. In horizontally moving the manhole cover 18 in the raised condition, the manhole cover 18 can be balanced and stabilized, because the manhole cover 18 is supported by the hook rods 4 depending perpendicularly from the supporting member 2. Furthermore, since the sets of wheels 16 on the right and left jack units 17 are always kept parallel to each other, the apparatus can be smoothly moved without unintentional turning. In addition, even when the legs 11 projecting downward from the horizontal extension members 8 are separated from the manhole cover 18, no trouble occurs in the operation.

Figure 3:
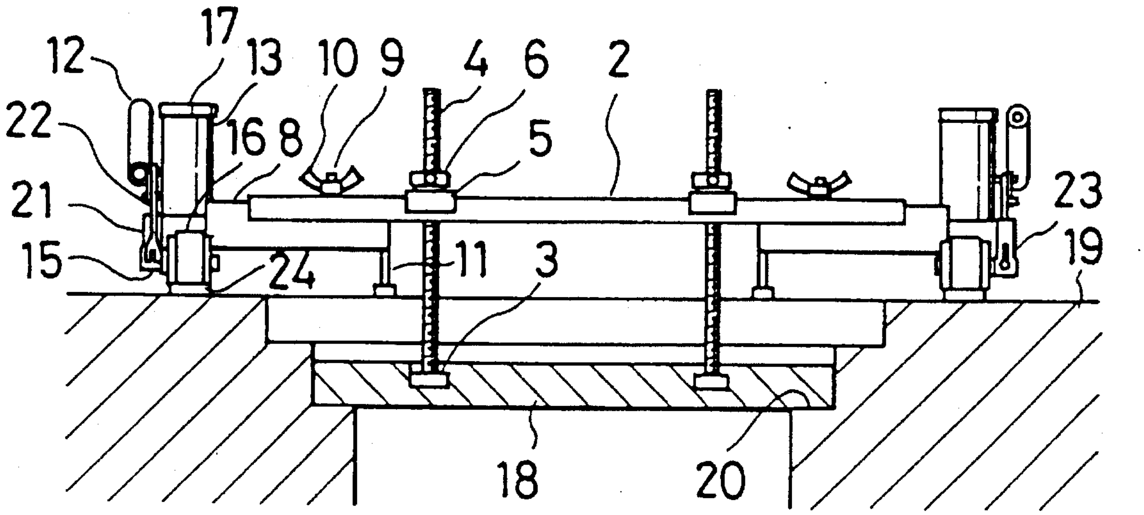
FIG. 3 is a front view of the opening and closing apparatus according to the present invention with a recessed manhole cover.

FIG. 3 shows a case where the manhole cover 18 is an inside cover of a double cover, wherein an outside cover, level with the ground surface 19, has already been opened. First, the bolts 9 inserted through the elongated holes 1 and 7 are loosened by rotating the nuts 10 to make both the horizontal extension members 8 slidable relative to the supporting member 2. In this condition, the horizontal positions of the horizontal extension members 8 are adjusted so that the total length of the supporting member 2 and the horizontal extension member 8, overlapping each other, becomes greater than the diameter of the outside cover. Then the nuts 10 are tightened to fix the supporting member 2 and the horizontal extension members 8 together to such a degree that these members 2 and 8 are mechanically united together. In this condition, the wheels 16 are placed on the ground surface 19, but the legs 11 are separated from the upper surface of the manhole cover 18. Then the two hook rods 4 are horizontally moved in the elongated holes 1, with the brackets 5 sliding on the supporting member 2, to adjust their horizontal positions. The clamps 6 are then rotated to vertically move the hook rods 4 until the lower hooks 3 are inserted into two catch holes formed on the upper surface of the manhole cover 18. Then the hook rods 4 are rotated to make the lower hooks 3 engage with the catch holes. Then the clamps 6 are rotated to raise the hook rods 4 and thereby tighten the lower hooks 3. Accordingly, G is applied to the whole of the apparatus, so that the operation can be advanced in a stable condition, and the tightening force applied to the lower hooks 3 is added to a force for raising the manhole cover 18. This effect can be similarly exhibited in the case where the lower hooks 3 are formed like hook-shaped wires. The levers 12 of the right and left jack units 17 are then operated to feed oil and thereby vertically raise the movable portions 13. As a result, the supporting member 2 integrated with the horizontal extension members 8 is vertically raised together with the movable portions 13, with the jack units 17 maintained in a vertical position. Accordingly, 100% of the vertical force for raising the supporting member 2 is applied to the two hook rods 4, thus breaking the adhesion between the manhole cover 18 and its sets and opening manhole cover 18. This results from the fact that the forces generated from the two jack units 17 have been integrated through the supporting member 2 without waste. In horizontally moving the manhole cover 18 in the raised condition, the manhole cover 18 can be balanced and stabilized, because the manhole cover 18 is supported by the hook rods 4 depending perpendicularly from the supporting member 2. Furthermore, since the sets of wheels 16 on the right and left jack units 17 are always kept parallel to each other, the apparatus can be smoothly moved without unintentional turning. In addition, even when the legs 11 projecting downward from the horizontal extension members 8 are separated from the manhole cover 18, no trouble occurs in the operation.

Figure 4:
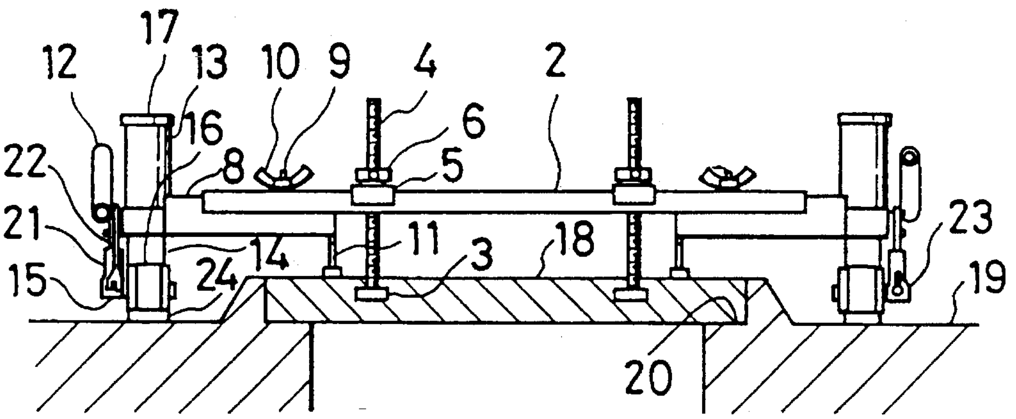
FIG. 4 is a front view of the opening and closing apparatus according to the present invention with a raised manhole cover.

FIG. 4 shows a case where the manhole cover 18 is a raised cover. First, the levers 12 of the two jack units 17 are operated to raise the movable portions 13 until the lower ends of the legs 11 become level with the upper surface of the manhole cover 18. Then, the bolts 9 inserted through the elongated holes 1 and 7 are loosened by rotating the nuts 10 to make both the horizontal extension members 8 slidable relative to the supporting member 2. In this condition, the horizontal positions of the horizontal extension members 8 are adjusted so that the total length of the supporting member 2 and the horizontal extension members 8, overlapping each other, becomes greater than the diameter of a raised portion of the ground surface 19 formed around the manhole cover 18. Then, the nuts 10 are tightened to fix the supporting member 2 and the horizontal extension members together to such a degree that these members 2 and 8 are mechanically united together. In this condition, the legs 11 are placed on the upper surface of the manhole cover 18, and the wheels 16 are placed on the ground surface 19. Then the two hook rods 4 are horizontally moved in the elongated holes 1, with the brackets 5 sliding on the supporting member 2 to adjust their horizontal positions. Then the clamps 6 are rotated to vertically move the hook rods 4 until the lower hooks 3 are inserted into two catch holes formed on the upper surface of the manhole cover 18. Then the hook rods 4 are rotated to make the lower hooks 3 engage with the catch holes. Then the clamps 6 are rotated to raise the hook rods 4 and thereby tighten the lower hooks 3. Accordingly, G is applied to the whole of the apparatus, so that the operation can be advanced in a stable condition, and the tightening force applied to the lower hooks 3 is added to a force for raising the manhole cover 18. This effect can be similarly exhibited in the case where the lower hooks 3 are formed like hook-shaped wires. The levers 12 of the right and left jack units 17 are then operated to feed oil and thereby vertically raise the movable portions 13. As a result, the supporting member 2 integrated with the horizontal extension members 8 is vertically raised together with the movable portions 13, with the jack units 17 maintained in a vertical position. Accordingly, 100% of the vertical force for raising the supporting member 2 is applied to the two hook rods 4, thus breaking the adhesion between the manhole cover 18 and its seat and opening the manhole cover 18. This results from the fact that the forces generated from the two jack unit 17 have been integrated through the supporting member 2 without waste. In horizontally moving the manhole cover 18 in the raised condition, the manhole cover 18 can be balanced and stabilized, because the manhole cover 18 is supported by the hook rods 4 depending perpendicularly from the supporting member 2. Furthermore, since the sets of wheels 16 on the right and left jack units 17 are always kept parallel to each other, the apparatus can be smoothly moved without unintentional turning. In addition, even when the legs 11 projecting downward from the horizontal extension members 8 are separated from the manhole cover 18, no trouble occurs in the operation.

As described above, according to the opening and closing apparatus for the manhole cover, the forces generated from the hydraulic jack units and the forces applied to the hook rods are always directed vertically, and the forces from the two jack units are completely integrated together to be exhibited. Accordingly, not only the conventional normal manhole cover but also special manhole covers including a thick-walled large-diameter cover, a double cover, and a raised cover can be securely opened and closed.

In horizontally moving the manhole cover opened and lifted by the apparatus, the manhole cover can be well balanced to be greatly stabilized because the manhole cover is supported by the hook rods depending perpendicularly from the supporting member. Furthermore, since the sets of wheels in the right and left jack units are kept always parallel to each other, the apparatus can be smoothly moved without unintentional turn, thus ensuring the safety.

I claim:

1. An opening and closing apparatus for a manhole cover, comprising:

a supporting member having a U-shaped cross section, an upper surface and a plurality of elongated holes therein along a longitudinal center line thereof;

two hook rods, each of said hook rods having a hook at a lower end and external threads, and each of said hook rods extending vertically through one of said elongated holes of said supporting member so as to be rotatable and horizontally adjustable therein;

a bracket for each of said hook rods, each said bracket having a U-shape in cross section and being disposed on said upper surface of said supporting member so as to be horizontally adjustable thereon, and each said bracket having an upper surface and a central hole therein through which a said hook rod extends;

a clamp for each of said hook rods, each said clamp having an internal thread engaging said external thread of a said hook rod, and each said clamp being supported on said upper surface of a said bracket and adapted to rotate to adjust the vertical position of the respective said hook rod;

two horizontal extension members, each said horizontal extension member comprising a straight bar having a U-shaped cross section and an elongated hole therein along a longitudinal center line thereof, said two horizontal extension members being horizontally adjustably connected to opposite ends of said supporting member such that upper surfaces of said horizontal extension members at least partially overlap with a lower surface of said supporting member;

a set of bolts and nuts for securing said supporting member to said two horizontal extension members, wherein said bolts extend through respective said elongated holes in said supporting member and said elongated holes of said two horizontal extension members;

a leg projecting downward from an inner end of each of said two horizontal extension members; and a hydraulic jack unit connected to each said horizontal extension member, each said hydraulic unit comprising a base having an upper surface, two wheels supported on said base at front and rear ends thereof and arranged in tandem in a direction perpendicular to the respective said horizontal extension member, a fixed portion fixed to and standing upright from said upper surface of said base, a movable portion vertically movable relative to said fixed portion, said movable portion having a side surface integrally connected to the respective said horizontal extension member and said movable portion extending vertically at right angles to the respective said horizontal extension member, and an operating lever for operating said hydraulic unit so as to vertically move said movable portion.

2. An apparatus, comprising:

a pair of hydraulic jack units, each hydraulic jack unit comprising a base having a pair of wheels thereon, a fixed portion fixed to and extending upwardly from said base, a movable portion vertically movable relative to said fixed portion upon operation of said hydraulic jack, and an operating lever for operating said hydraulic jack unit;

a pair of horizontal extension members, wherein each said horizontal extension member is fixed to a respective said movable portion of a respective said hydraulic jack, and wherein each of said horizontal extension members comprises a bar having a horizontal upper surface with an elongated hole therein and a leg projecting downward from an end of said horizontal extension member spaced from said hydraulic jack unit;

a supporting member extending from one of said horizontal extension members to the other of said horizontal extension members, said supporting member having an upper horizontal surface with a plurality of elongated holes therein, said supporting member having opposite ends horizontally adjustably connected to respective ones of said pair of horizontal extension members through said elongated holes of said supporting member and said horizontal extension members; and a pair of hook rods, each of said hook rods extending vertically through one of said elongated holes so as to be rotatably and horizontally adjustable in said elongated holes, and each of said hook rods having a hook at a lower end thereof.

3. The apparatus of claim 2, wherein each said hook rod extends through a respective said bracket on said supporting member and is vertically adjusted by a clamp supported on an upper surface of said bracket.

4. The apparatus of claim 3, wherein each said hook rod has an external thread and each said clamp has an internal thread engaging said external thread of the respective said hook rod.

5. The apparatus of claim 3, wherein said supporting member is U-shaped in cross section, and each of said brackets is U-shaped in cross section, located on an upper surface of said supporting member so as to be horizontally adjustable thereon, and has a central hole therein through which a respective said hook rod extends.

6. The apparatus of claim 2, wherein said supporting member and said horizontal extension members are U-shaped in cross section, with said horizontal extension members nested in and overlapping said supporting member.

7. The apparatus of claim 6, wherein said supporting member and said horizontal extension members are horizontally adjustably connected to each other with nuts and bolts through said elongated holes.

* * * * *